United States Patent
Yamashita et al.

(10) Patent No.: US 10,057,132 B2
(45) Date of Patent: Aug. 21, 2018

(54) APPARATUS AND METHOD FOR DETECTING CONNECTION RELATIONSHIPS AMONG SWITCHES IN A COMMUNICATION NETWORK

(71) Applicant: FUJITSU LIMITED, Kawasaki-shi, Kanagawa (JP)

(72) Inventors: Shinji Yamashita, Kawasaki (JP); Kenji Hikichi, Kawasaki (JP); Akiko Yamada, Kawasaki (JP); Toshio Soumiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 15/051,058

(22) Filed: Feb. 23, 2016

(65) Prior Publication Data
US 2016/0285695 A1 Sep. 29, 2016

(30) Foreign Application Priority Data
Mar. 24, 2015 (JP) .................. 2015-061251

(51) Int. Cl.
| G06F 11/00 | (2006.01) |
| H04J 1/16 | (2006.01) |
| H04J 3/14 | (2006.01) |
| H04L 12/26 | (2006.01) |
| H04L 12/24 | (2006.01) |
| H04L 29/08 | (2006.01) |

(52) U.S. Cl.
CPC ............ *H04L 41/12* (2013.01); *H04L 69/324* (2013.01)

(58) Field of Classification Search
CPC .............................. H04L 41/12; H04L 69/324

USPC ................. 370/254, 255, 256, 412, 413–420
See application file for complete search history.

(56) References Cited

U.S. PATENT DOCUMENTS

| 6,563,835 | B1 * | 5/2003 | Chen ................... H04L 12/5601 |
| | | | 370/395.1 |
| 9,130,870 | B1 * | 9/2015 | Swierk .................... H04L 45/46 |
| 9,467,363 | B2 * | 10/2016 | Gao ........................ H04L 45/18 |
| 9,843,496 | B2 * | 12/2017 | Sato ................... H04L 12/6418 |
| 2009/0138577 | A1 | 5/2009 | Casado et al. |

(Continued)

FOREIGN PATENT DOCUMENTS

| JP | 2014-27443 | 2/2014 |
| JP | 2014-42328 | 3/2014 |

(Continued)

*Primary Examiner* — Chuong T Ho
(74) *Attorney, Agent, or Firm* — Staas & Halsey LLP

(57) ABSTRACT

A network control apparatus is configured to detect connection relationships among a plurality of network switches in a communication network. The network control apparatus transmits a control signal to a first network switch, where the control signal commands the first network switch to transmit a first topology detection signal from a first plurality of ports provided for the first network switch. The network control apparatus receives, from a second network switch that has received the first topology detection signal, a response signal including topology information that has been detected by the second network switch from the first topology detection signal, and, based on the topology information included in the response signal, controls selection of a target port, via which to transmit a second topology detection signal, from among a second plurality of ports provided for the second network switch.

7 Claims, 24 Drawing Sheets

(56) References Cited

U.S. PATENT DOCUMENTS

| | | | |
|---|---|---|---|
| 2011/0305167 A1* | 12/2011 | Koide | H04L 41/12 |
| | | | 370/255 |
| 2013/0279371 A1* | 10/2013 | Takashima | H04L 45/38 |
| | | | 370/254 |
| 2014/0269260 A1* | 9/2014 | Xue | H04L 41/12 |
| | | | 370/225 |
| 2014/0269691 A1* | 9/2014 | Xue | H04L 45/125 |
| | | | 370/389 |
| 2015/0003259 A1* | 1/2015 | Gao | H04L 45/18 |
| | | | 370/244 |

FOREIGN PATENT DOCUMENTS

| | | | |
|---|---|---|---|
| WO | 2011/080870 A1 | | 7/2011 |
| WO | WO2014112612 | * | 7/2014 |

* cited by examiner

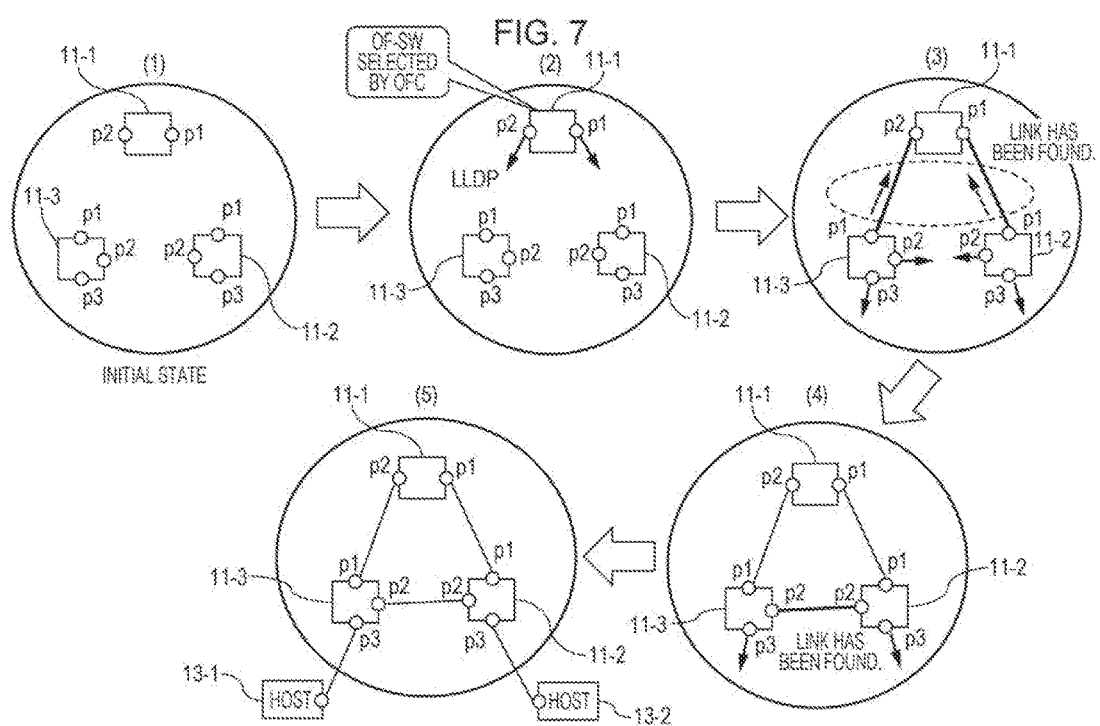

FIG. 8A

OFC 12 → OF-SW1

| LLDP HEADER | TRANSMISSION DESTINATION: SW1[p1]<br>TRANSMISSION SOURCE: OFC |
|---|---|

FIG. 8B

OFC 12 → OF-SW1

| LLDP HEADER | TRANSMISSION DESTINATION: SW1[p2]<br>TRANSMISSION SOURCE: OFC |
|---|---|

| LLDP HEADER | TRANSMISSION DESTINATION: VACANT<br>TRANSMISSION SOURCE: SW1[p1] |
|---|---|

| LLDP HEADER | TRANSMISSION DESTINATION: VACANT<br>TRANSMISSION SOURCE: SW1[p2] |
|---|---|

FIG. 10A

OF-SW2 → OFC 12

| LLDP HEADER | TRANSMISSION DESTINATION: OFC<br>TRANSMISSION SOURCE: SW2[p1] |
|---|---|

FIG. 10B

OF-SW3 → OFC 12

| LLDP HEADER | TRANSMISSION DESTINATION: OFC<br>TRANSMISSION SOURCE: SW3[p1] |
|---|---|

OFC 12 → OF-SW2

OFC 12 → OF-SW2

| LLDP HEADER | TRANSMISSION DESTINATION: VACANT<br>TRANSMISSION SOURCE: SW2[p2] |
|---|---|

| LLDP HEADER | TRANSMISSION DESTINATION: VACANT<br>TRANSMISSION SOURCE: SW2[p3] |
|---|---|

FIG. 13A

OF-SW2 → OFC 12

| LLDP HEADER | TRANSMISSION DESTINATION: OFC<br>TRANSMISSION SOURCE: SW2[p2] |

FIG. 13B

OF-SW3 → OFC 12

| LLDP HEADER | TRANSMISSION DESTINATION: OFC<br>TRANSMISSION SOURCE: SW3[p2] |

OFC 12 → OF-SW2

OFC 12 → OF-SW3

| LLDP HEADER | TRANSMISSION DESTINATION: VACANT<br>TRANSMISSION SOURCE: SW2[p3] |
|---|---|

| LLDP HEADER | TRANSMISSION DESTINATION: VACANT<br>TRANSMISSION SOURCE: SW3[p3] |
|---|---|

APPARATUS AND METHOD FOR DETECTING CONNECTION RELATIONSHIPS AMONG SWITCHES IN A COMMUNICATION NETWORK

CROSS-REFERENCE TO RELATED APPLICATION

This application is based upon and claims the benefit of priority of the prior Japanese Patent Application No. 2015-061251, filed on Mar. 24, 2015, the entire contents of which are incorporated herein by reference.

FIELD

The embodiment discussed herein is related to apparatus and method for detecting connection relationships among switches in a communication network.

BACKGROUND

Software-defined networking (SDN), which controls the entire behavior of a network with software, is attracting attention. A technology or protocol called OpenFlow (OF) (registered trademark) is known as a method that implements SDN.

On an OF network complying with the OF protocol, the Link Layer Discovery Protocol (LLDP) may be used to detect the topology of the OF network. LLDP, which is internationally standardized as IEEE802.1AB, is a protocol used to detect and manage a layer 2 (L2) connection.

For example, an open flow controller (OFC) transmits and receives signals to and from a plurality of OF switches forming an OF network to detect connection relationships among these OF switches. Detecting a connection relationship between OF switches may be translated into finding a link between these OF switches.

LLDP may be used for signals that detect connection relationships among OF switches. Signals complying with LLDP may be translated into LLDP messages, LLDP frames, LLDP packages, and the like.

Examples of related art are described in International Publication Pamphlet No. WO 2011/080870, Japanese Laid-open Patent Publication No. 2014-42328, and Japanese Laid-open Patent Publication No. 2014-27443.

SUMMARY

According to an aspect of the invention, an apparatus transmits a control signal to a first network switch, where the control signal commands the first network switch to transmit a first topology detection signal from a first plurality of ports provided for the first network switch. The apparatus receives, from a second network switch that has received the first topology detection signal, a response signal including topology information that has been detected by the second network switch from the first topology detection signal, and, based on the topology information included in the response signal, controls selection of a target port, via which to transmit a second topology detection signal, from among a second plurality of ports provided for the second network switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a schematic diagram illustrating an example of topology detection using LLDP, according to an embodiment;

FIGS. 8A and 8B are diagrams each illustrating an example of a packet-out message transmitted from a OFC to an OF switch, according to an embodiment;

FIGS. 9A and 9B are diagrams each illustrating an example of an LLDP message transmitted from a port of an OF switch that has received a packet-out message, according to an embodiment;

FIGS. 10A and 10B are diagrams each illustrating an example of a packet-in message transmitted, to the OFC, from an OF switch that has received a LLDP message, according to an embodiment;

FIGS. 12A and 12B are diagrams each illustrating an example of an LLDP message transmitted from a port of an OF switch that has received a packet-out message, according to an embodiment;

FIGS. 13A and 13B are diagrams each illustrating an example of a packet-in message transmitted, to an OFC, from an OF switch that has received a LLDP message, according to an embodiment;

FIGS. 15A and 15B are diagrams each illustrating an example of an LLDP message transmitted from a port of an OF switch that has received a packet-out message, according to an embodiment;

DESCRIPTION OF EMBODIMENTS

Figure 1:
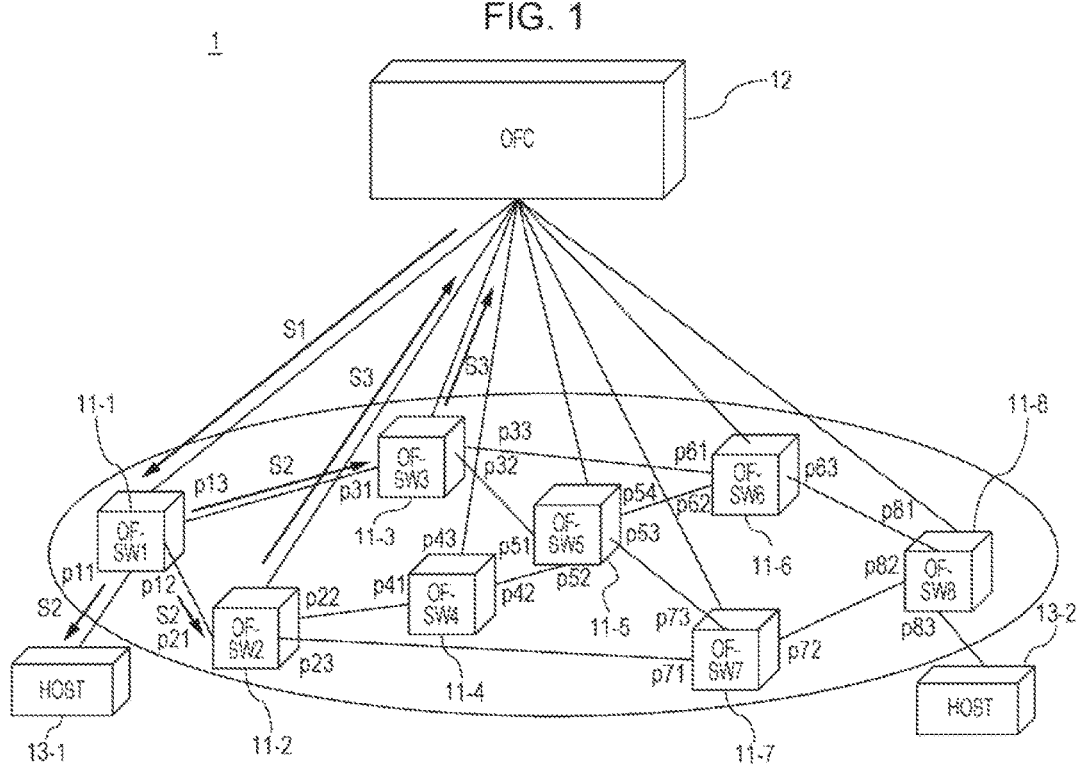
FIG. 1 is a diagram illustrating an example of a configuration of a network, according to an embodiment.

In the detection of an OF network topology by using LLDP, the larger the size of the OF network is, the more LLDP signals involved in the detection of its topology are increased. This leads to the risk of the OFC and OF network being overloaded.

An Embodiment will be described below with reference to the drawings. The embodiment described below is only illustrative; there is no intention to exclude the application of various modifications and technologies that are not clearly described below. Various exemplary aspects described below may be practiced in an appropriate combination. In the drawings referenced in the embodiment described below, unless otherwise noted, elements denoted by the same numerals are the same elements or similar elements.

FIG. 1 is a block diagram that illustrates an example of the structure of a network according to an embodiment. The network 1 in FIG. 1 is exemplary an OF network complying with the OF protocol. For convenience, the term "network" may be referred to as "system".

The OF network 1 may exemplary include a plurality of OF switches (OF-SWs) 11-1 to 11-N (N is an integer equal to or greater than 2), and an OF controller (OFC) 12. In the example in FIG. 1, N is 8. If the OF switches 11-1 to 11-N are not asked to be differentiated, they may be referred to as OF switches 11-$i$ ($i$ is one of 1 to N) or OF switches 11 for convenience. The OF switch is an example of a network switch.

Each OF switches 11 includes one or a plurality of ports (denoted p). The OF switch 11 is connected through one of ports thereof to another OF switch 11 so that communication is possible. Without being limited to another OF switch 11, a host such as a server is sometimes connected to a port of the OF switch 11. A port of the OF switch 11, which is connected to a host, may be referred to as an edge port of the OF network 1.

In, for example, FIG. 1, the OF switch 11-1 has three ports denoted p11, p12, and p13, where a host 13-1 is connected to the port p11, the port p12 is connected to the port p21 of the OF switch 11-2, and the port p13 is connected to the port p31 of the OF switch 11-3.

When attention is focused on the OF switch 11-2, the port p21 is connected to the port p12 of the OF switch 11-1, a port p22 is connected to the port p41 of the OF switch 11-4, and a port p23 is connected to the port p71 of the OF switch 11-7.

When attention is focused on the OF switch 11-3, the port p31 is connected to the port p13 of the OF switch 11-1, a port p32 is connected to the port p51 of the OF switch 11-5, and a port p33 is connected to the port p61 of the OF switch 11-6.

When attention is focused on the OF switch 11-4, the port p41 is connected to the port p22 of the OF switch 11-2 and a port p42 is connected to the port p52 of the OF switch 11-5.

When attention is focused on the OF switch 11-5, the port p51 is connected to the port p32 of the OF switch 11-3, the port p52 is connected to the port p42 of the OF switch 11-4, a port p53 is connected to the port p73 of the OF switch 11-7, and a port p54 is connected to the port p62 of the OF switch 11-6.

When attention is focused on the OF switch 11-6, the port p61 is connected to the port p33 of the OF switch 11-3, the port p62 is connected to the port p54 of the OF switch 11-5, and a port p63 is connected to the port p81 of the OF switch 11-8.

When attention is focused on the OF switch 11-7, the port p71 is connected to the port p23 of the OF switch 11-2, a port p72 is connected to the port p82 of the OF switch 11-8, and the port p73 is connected to the port p53 of the OF switch 11-5.

When attention is focused on the OF switch 11-8, the port p81 is connected to the port p63 of the OF switch 11-6, the port p82 is connected to the port p72 of the OF switch 11-7, and a port p83 is connected to a host 13-2. In the description below, when the host 13-2 and host 13-1 are not asked to be differentiated, they may be referred to as the hosts 13.

If the switch number of the OF switch 11 is represented as $i$ and the number of a port of the OF switch 11 is represented as n, each port of the OF switch 11-$i$ may be identified with a combination of a switch number $i$ and a port number n described above (n is an integer equal to or greater than 1) as described above. The term "number" may be translated into "identification number" or "identifier". The identification information about the OF switch 11 may be referred to as a data path identifier (Datapath ID, or DPID).

The OFC 12 is connected to OF switches 11, each of which is an element of the OF network 1, so that communication is possible, and controls communication among the OF switches 11. The Transmission Control Protocol (TCP) and Transport Layer Security (TLS) may be applied to a connection between the OFC 12 and each OF switch 11.

Communication between OF switches 11 is exemplary data transfer based on a data plane, so it may be referred to as a data flow. Data transferred in a data flow may be packet data. Packet data may be simply referred to as a packet. A path of a data flow may be referred to as a data path. The data path identifier described above may be used to identify a data path on the OF network 1.

The OFC 12 may centrally manage and control data flows among the OF switches 11. For example, the OFC 12 may centrally manage and control entries in flow tables stored in the OF switches 11.

To control data flows among the OF switches 11, the OFC 12 detects topology information about the OF network 1. The topology information is an example of information with which connection relationships among the OF switches 11 on the OF network 1 may be identified. The OFC 12 may perform path calculations about the OF network 1 and the like with reference to the topology information.

LLDP may be applied to detection of topology information (for convenience, it may be simply referred to as topology detection). The OFC 12 transmits a signal complying with LLDP to an OF switch 11 for which to investigate a connection relationship. A signal complying with LLDP may be referred to as an LLDP message, an LLDP frame, or an LLDP packet.

The LLDP message may include a DPID and a port number of an OF switch 11 for which to investigate a connection relationship, and may also include information that designates an operation to be performed by the OF switch 11 that has received the LLDP message (the operation may be referred to as the action).

Information instructing an OF switch 11 to transmit a LLDP message from a port identified by the specified port number may be illustratively set as the action. This type of LLDP message, in which an action is specified and which is transmitted to an OF switch 11, may be referred to as a packet-out message. The packet-out message may be simply referred to as a packet-out. The packet-out may be thought of as an example of a control signal that is transmitted from the OFC 12 to an OF switch 11.

For example, when OF switches 11 are connected to the OFC 12 at the time of the initial startup of the OF network 1, a packet-out may be transmitted to these OF switches 11. For example, when an OF switch 11 is started after it has been connected to the OF network 1, the OF switch 11 may transmit a switch join (SJ) event to the OFC 12. The SJ event is an example of a signal that notifies the OFC 12 that the OF switch 11 has been connected to the OF network 1 ("connected" may be translated into "added").

In response to reception of the SJ event, the OFC 12 sets the OF switch 11 that is the transmission source from which the OFC 12 has received the SJ event, as a candidate for a target for which the OFC 12 tries to find a link (in other words, a destination to which to transmit a packet-out). A packet-out may be transmitted from the OFC 12 to the OF switch 11 that has been set as a target for which the OFC 12 tries to find a link.

In a case as well in which, for example, after the OFC 12 has recovered from a failure, OF switches 11 are reconnected to the OFC 12, the SJ event may be transmitted from these OF switches 11 to the OFC 12.

When a (first) OF switch 11 receives a packet-out, the first OF switch 11 transmits an LLDP message, which is an example of a topology detection signal, from a specified port according to the commanded action.

The LLDP message may include information (such as a port number) with which a port from which the LLDP message has been transmitted may be identified, as transmission source port information about the LLDP message.

When another (a second) OF switch 11 is connected to the port from which the LLDP message has been transmitted, the LLDP message may be received at the second OF switch 11.

When it is assumed that a method of processing the received LLDP message is not set in the second OF switch 11, the second OF switch 11 transmits an LLDP message to the OFC 12 to inquire a processing method from the OFC 12.

An LLDP message transmitted from an OF switch 11 to the OFC 12 may be referred to as a packet-in message. A packet-in message may be simply referred to as a packet-in. A packet-in may be regarded as an example of a response signal that is transmitted from an OF switch 11 to the OFC 12.

The packet-in may include the DPID of the second OF switch 11, which is a transmission source, the port number identifying a port via which the LLDP message has been received. The OFC 12 may detect an inter-port connection between the first OF switch 11 and the second OF switch 11 from information included in the packet-out transmitted to the first OF switch 11 and information included in the packet-in received from the second OF switch 11. The detection of the inter-port connection may be referred to as the finding (discovery) of a link or as the detection of a topology.

In the example in FIG. 1, the OF switch 11-1 is equivalent to the first OF switch 11. The OF switches 11-2 and 11-3 connected to the OF switch 11-1 are each equivalent to the second OF switch. For convenience, an OF switch 11 connected to another OF switch 11 may be rephrased as an OF switch 11 adjacent to another OF switch 11.

When topology detection starts, the OFC 12 transmits, to the OF switch 11-1, a packet-out in which transmission of an LLDP message from all the ports p11 to p13 is specified as an action (processing S1).

In the example in FIG. 1, although attention is focused on processing in which a packet-out is transmitted from the OFC 12 to the OF switch 11-1, the OFC 12 may transmit a packet-out message, in a step-by-step manner or in parallel, to all the OF switches 11 from which the OFC 12 has received an SJ event.

Upon receiving the packet-out, the OF switch 11-1 transmits a message from each of the ports p11 to p13 specified in the packet-out by including the DPID thereof in the message (processing S2).

A transmission source port number (p11, p12, or p13) may be included in the LLDP message transmitted from each of the ports p11 to p13. The transmission source port number may be referred to as transmission source port information.

The LLDP messages transmitted from the ports p11 to p13 are received at the host 13-1, the port p21 of the OF switch 11-2, and the port p31 of the OF switch 11-3, respectively.

The OF switches 11-2 and 11-3 each transmit a packet-in to the OFC 12, assuming that a method of processing the received LLDP message has not been set in the flow table (processing S3).

For example, the OF switch 11-2 includes, in the received LLDP message, the DPID of the OF switch 11-2 and the port number (p21) via which the LLDP message has been received, and transmits the LLDP message to the OFC 12 as a packet-in.

Similarly, the OF switch 11-3 includes, in the received LLDP message, the DPID of the OF switch 11-3 and the port number (p31) via which the LLDP message has been received, and transmits the LLDP message to the OFC 12 as a packet-in.

The OFC 12 analyzes the packet-ins received from the OF switches 11-2 and 11-3, and finds a link between the OF switches 11-1 and 11-2 and a link between the OF switches 11-1 and 11-3. Finding a link may be regarded as detection (or acquisition) of information that indicates the presence of a link between OF switches 11 and the port numbers identifying a pair of ports of the OF switches 11, which are equivalent to both ends of the link.

For example, the OFC 12 finds a link between the port p12 of the OF switch 11-1 and the port p21 of the OF switch 11-2, from the DPIDs and port numbers included in the packet-in messages. Similarly, the OFC 12 finds a link between the port p13 of the OF switch 11-1 and the port p31 of the OF switch 11-3.

In the example in FIG. 1, the LLDP message transmitted from the port p11 of the OF switches 11-1 is received at the host 13-1, which is not an OF switch 11. Therefore, no packet-in is transmitted from the host 13-1 to the OFC 12.

In other words, even if the host 13-1 receives an LLDP message, the host 13-1 does not respond to the received LLDP message.

The OFC 12 may repeat transmission of a packet-out and reception of a packet-in responsive to the packet-out, as described above, for the respective OF switches 11 in the OF network 1, for which to investigate a connection relationship.

For example, the OFC 12 may repeatedly transmit a packet-out to the OF switches 11-2 to 11-8, in a step-by-step manner. The OFC 12 may select an OF switch 11 from which a packet-in has been received in response to transmission of the packet-out, as a transmission destination to which to transmit a next packet-out.

In other words, the OFC 12 gradually expands a topology detection range on the OF network 1, by changing a target OF switch 11 to which to transmit a packet-out to an OF switch 11 from which a packet-in has been received, in a step-by-step manner. Thus, the OFC 12 may finally detect topology information about the whole of the OF network 1.

After having detected the topology of the whole of the OF network 1, the OFC 12 may execute the procedure described above at, for example, regular or irregular intervals, and the OFC 12 may update topology information upon detecting change in the topology of the whole of the OF network 1.

The more the number of OF switches 11 on the OF network 1 is increased, the more the number of LLDP message transmissions and receptions involved in topology detection is also increased, thereby increasing loads on the OFC 12 and OF network 1.

In a case in which, for example, the topology of a large-scale OF network 1 is to be detected, when a plurality of OF switches 11 are connected to the OFC 12 and they are activated, SJ events may be transmitted from these OF switches 11 to the OFC 12 at the same time.

When the OFC 12 causes each OF switch 11 to transmit an LLDP message from its all the ports in response to the received SJ event, the OFC 12 may receive a large amount of packet-ins from all the OF switches 11 each of which has a connection relationship with an OF switch 11 that has received a packet-out. This leads to the risk of the OFC 12 being overloaded.

Examples of cases in which the OFC 12 may be overloaded as described above are assumed as follows.

(1) A case in which these connections are established in a state where connections and settings among all OF switches 11 have been completed at the time of the initial startup of the OF network 1, but TCP (or TLS) connections with the OFC 12 have not been established (this state may be referred to as a transient state). In the transient state, the OFC 12 is unable to transmit packet-outs and receive packet-ins OF since the switches 11 remain unable to transmit an SJ event to the OFC 12.

(2) A case in which, after a failure occurred in the OFC 12 and a connection between the OFC 12 and each OF switch 11 was broken, the OFC 12 has recovered from the failure and each OF switch 11 and OFC 12 are reconnected to each other.

In the cases (1) and (2) above, it is assumed that, for example, the OFC 12 transmits, in a sted-by-step manner to each OF switch 11, a packet-out in which transmission of an LLDP message from all the ports is specified.

In this case, an LLDP message, which is an example of a topology detection signal, may be transmitted from the OF switch 11 as well for which a link has been found in a previous packet-out transmission. As a result, the packet-ins each of which includes the DPID and the port numbers corresponding to the found link are redundantly transmitted to the OFC 12.

Figure 2:
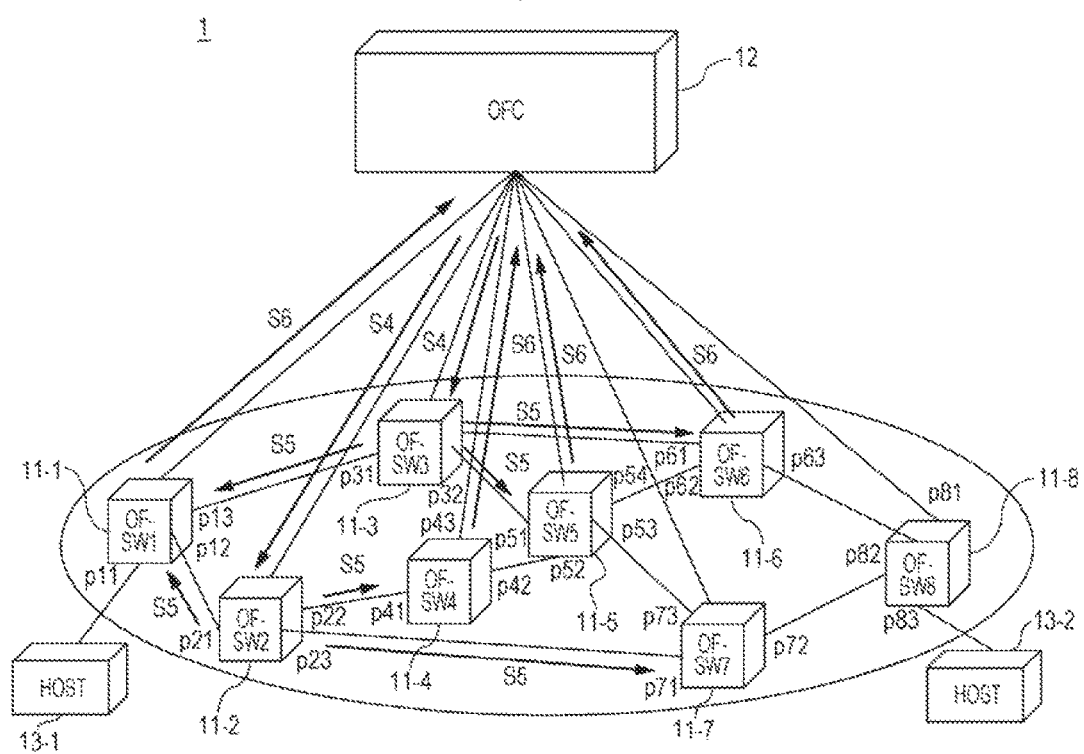
FIG. 2 is a schematic diagram illustrating an example of a method of detecting topology of a network, according to an embodiment.

For example, it is assumed that, after the link of the OF switch 11-1 has been found as described with reference to FIG. 1, the OFC 12 selects the OF switches 11-2 and 11-3, which are packet-in transmission sources, as targets for which the OFC 12 tries to find a link, as illustrated in FIG. 2. In the case, the OFC 12 may transmit a packet-out message to the OF switches 11-2 and 11-3 (processing S4).

When transmission of an LLDP message from all the ports is specified in the packet-out message as an action, the OF switches 11-2 and 11-3 transmit an LLDP message from the ports as well for which the OFC 12 has found a link (processing S5).

For example, although the link between the port p21 of the OF switch 11-2 and the port p12 of the OF switch 11-1 has been already found, the OF switch 11-2 transmits an LLDP message from the ports p21 to p23 thereof in response to a received packet-out message.

Similarly, although the link between the port p31 of the OF switch 11-3 and the port p13 of the OF switch 11-1 has been already found, the OF switch 11-3 transmits an LLDP message from the ports p31 to p33 thereof in response to a received packet-out message.

The LLDP message transmitted from the port p21 by the OF switch 11-2 and the LLDP message transmitted from the port p31 by the OF switch 11-3 are received at the OF switch 11-1.

Therefore, the OF switch 11-1 transmits a packet-in message including the port number of a port for which the link has been already found by the OFC 12 to the OFC 12 in response to each received LLDP message (processing S6).

In the example in FIG. 2, the OF switch 11-4 receives an LLDP message from the OF switch 11-2, and the OF switches 11-5 and 11-6 receive an LLDP message from the OF switch 11-3. Therefore, the OF switches 11-4 to 11-6 also transmit a packet-in message to the OFC 12.

In the example in FIG. 2, the packet-in message transmitted from the OF switch 11-1 includes no information about a new link. As a result, the packet-in message does not take effect for the OFC 12. If it is possible to avoid or suppress transmission of waste packet-in messages of this type, loads on the OFC 12 and OF network 1 may be reduced.

Figure 3:
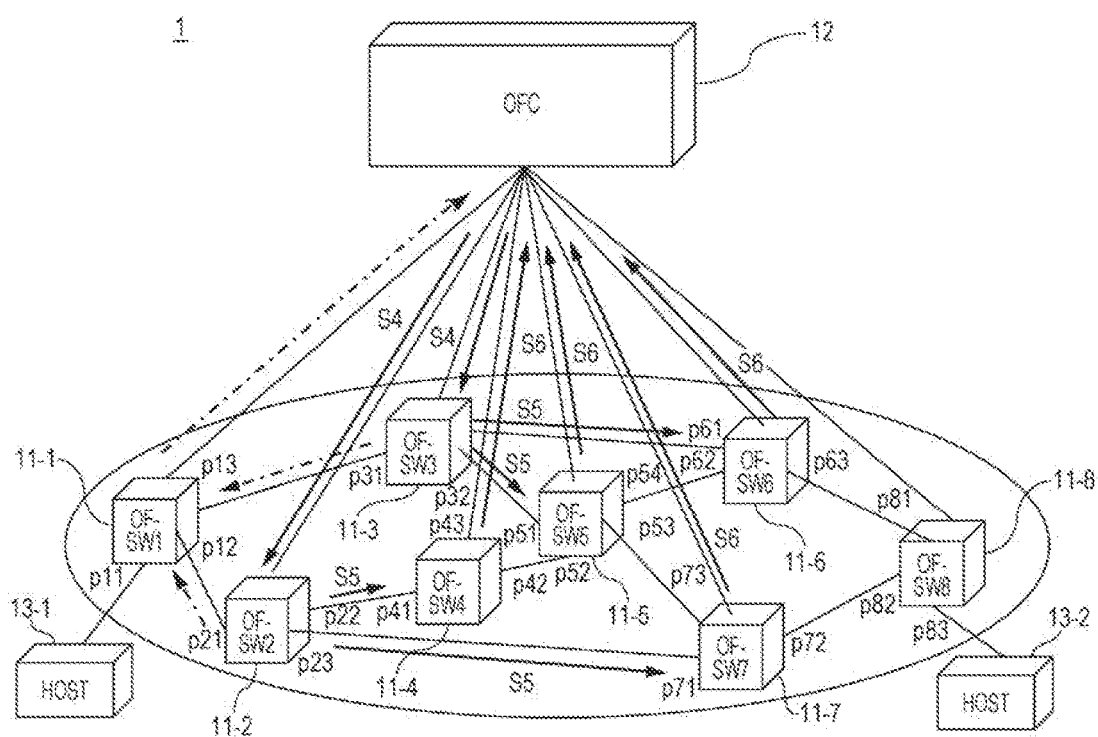
FIG. 3 is a schematic diagram illustrating an example of suppressing LLDP message transmission from ports for which links have been found on a network, according to an embodiment.

To achieve this, in the example in FIG. 2, it suffices to suppress the OF switches 11-2 and 11-3 from transmitting an LLDP message from the port for which the OFC 12 has found a link (see the dash-dot lines in FIG. 3, for example).

To suppress LLDP messages from being transmitted from ports for which a link has been found, it suffices, for example, for the OFC 12 to exclude a port number identifying a port for which a link has been already found, from the candidates of port numbers identifying ports for which transmission is to be specified in the packet-outs.

In the example in FIG. 3, for example, the OFC 12 designates the port numbers p22 and p23 in a packet-out to be transmitted to the OF switch 11-2 without designating the port number p21, for which a link has been already found. The OFC 12 also designates the port numbers p32 and p33 in a packet-out to be transmitted to the OF switch 11-3 without designating the port number p31, for which a link has been already found.

Figure 4:
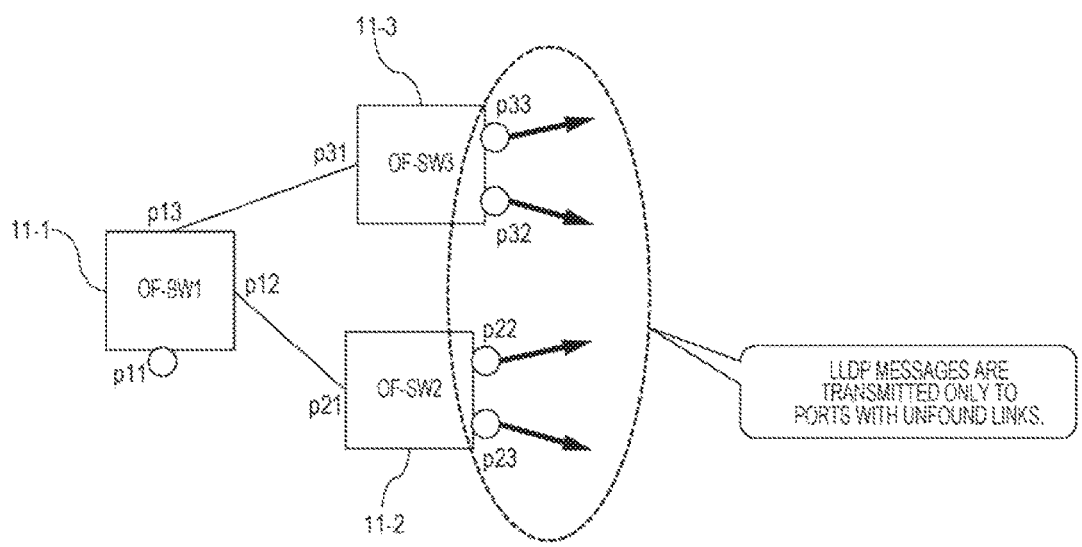
FIG. 4 a schematic diagram illustrating an example of suppressing LLDP message transmission from ports for which links have been found, according to an embodiment.

Thus, as schematically illustrated in, for example, FIG. 4, upon receiving a packet-out, the OF switch 11-2 does not transmit an LLDP message from the port p21 linked to the OF switch 11-1, for which the link has been already found.

The OF switch 11-2 transmits an LLDP message only from the ports p22 and p23, for which a link has not been found.

Similarly, upon receiving a packet-out, the OF switch 11-3 does not transmit an LLDP message from the port p31 linked to the OF switch 11-1, for which a link has been found. The OF switch 11-3 transmits an LLDP message only from the ports p32 and p33, for which a link has not been found yet.

Excluding a port number for which a link has been found from candidates of information to be specified in packet-outs may be regarded as equivalent to controlling LLDP message transmission by an OF switch 11. Controlling LLDP message transmission by an OF switch 11 may be regarded as controlling an LLDP message transmission pattern.

Examples of configurations of an OFC and an OF switch

Next, a configuration of the OFC 12 that enables the operations described above will be described with reference to FIG. 5. The configuration of the OF switch 11 will also be described with reference to FIG. 6.

Example of a configuration of the OFC

Figure 5:
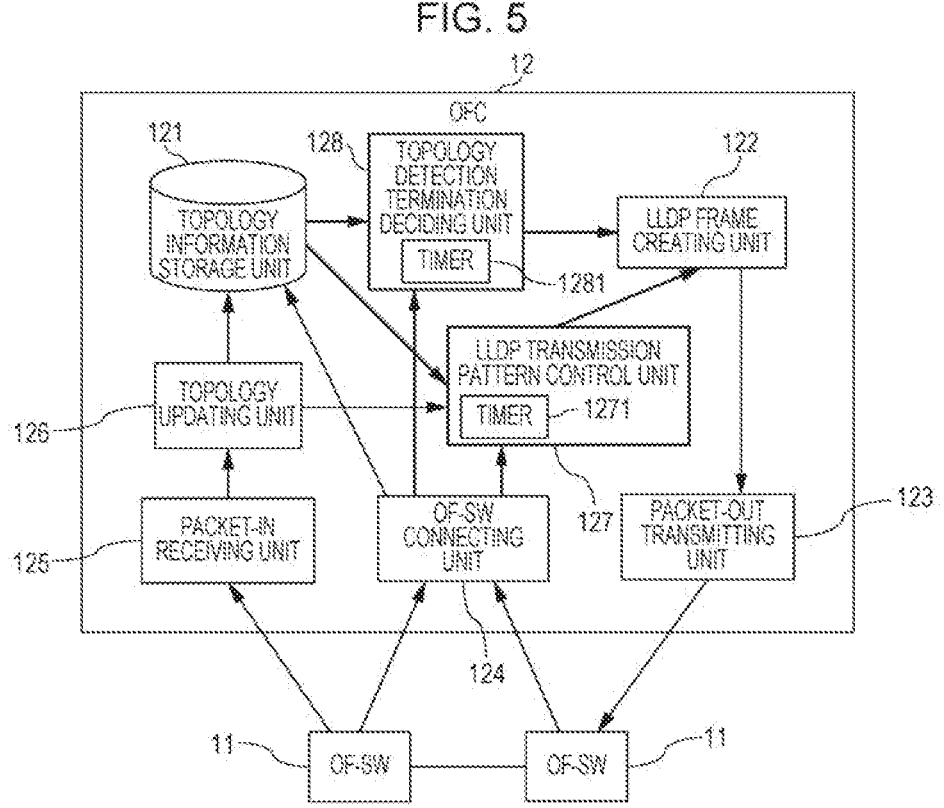
FIG. 5 is a diagram illustrating an example of a configuration of an OFC, according an embodiment.

The OFC 12 illustrated in FIG. 5 may exemplary include a topology information storage unit 121, an LLDP frame creating unit 122, a packet-out transmitting unit 123, an OF switch connecting unit 124, a packet-in receiving unit 125, and a topology updating unit 126. The OFC 12 may include an LLDP transmission pattern control unit 127 and a topology detection termination deciding unit 128.

The topology information storage unit 121 stores topology information on the OF network 1. As the topology information storage unit 121, a random-access memory (RAM), a flash memory, a hard disk drive (HDD), or another storage device may be applied.

The LLDP frame creating unit 122 exemplary creates LLDP frames such as packet-out messages.

The packet-out transmitting unit 123 exemplary transmits a packet-out message to any one of OF switches 11.

The OF switch connecting unit 124 exemplary establishes a connection in TCP or TLS described above between OF switches 11 on the OF network 1.

The packet-in receiving unit 125 exemplary receives a packet-in message transmitted from any one of OF switches 11.

The topology updating unit 126 exemplary detects topology information according to the packet-in message received by the packet-in receiving unit 125, and updates the topology information stored in the topology information storage unit 121 with the detected topology information.

According to the topology information in the topology information storage unit 121, the LLDP transmission pattern control unit 127 exemplary controls the pattern of LLDP message transmission by an OF switch 11 as described above.

For example, the LLDP transmission pattern control unit 127 identifies a port number of a port of the OF switch 11, for which a link has been found, with reference to the topology information in the topology information storage unit 121, and excludes the identified port number from the candidates to be specified in packet-outs.

The topology detection termination deciding unit 128 exemplary decides whether the topology of the OF network 1 has been detected. When, in the OF switch connecting unit 124, no SJ event is received within a set time, the topology detection termination deciding unit 128 may exemplary decide that topology detection has been completed, as described below.

In other words, in a case where it is possible to determine that a port of the OF switch 11 for which a link has not been found is linked to a host 13, the topology detection termination deciding unit 128 may decide that topology detection has been completed.

For example, even if the LLDP transmission pattern control unit 127 causes an LLDP message to be transmitted from a port of the OF switch 11, for which a link has not been found, when a packet-in message is not received at the packet-in receiving unit 125, it may be decided that the port is linked to a host 13.

The functions of the OFC 12 mentioned above, such as an LLDP frame creating unit 122, a packet-out transmitting unit 123, an OF switch connecting unit 124, a packet-in receiving unit 125, a topology updating unit 126, an LLDP transmission pattern control unit 127, and a topology detection termination deciding unit 128, may be implemented by using a processor (a hardware processor) and a memory coupled to the processor.

Example of a Configuration of an OF Switch

Figure 6:
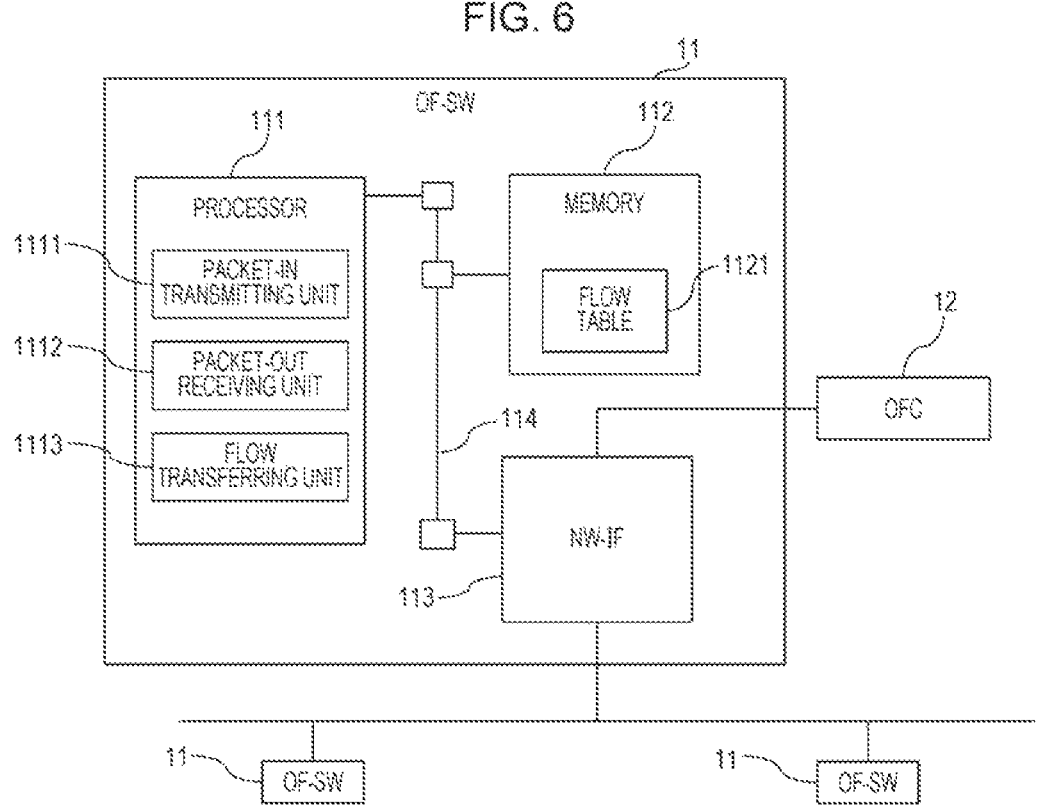
FIG. 6 is a diagram illustrating an example of a configuration of an OF switch, according an embodiment.

As illustrated in FIG. 6, the OF switch 11 exemplary may include a processor 111, a memory 112, and a network interface (NW-IF) 113. The processor 111, memory 112, and NW-IF 113 may be mutually connected through a bus 114 so that communication is possible.

The processor 111 controls the overall operations of OF switches 11. As the processor 111, a computing apparatus, a computing circuit, or computing device that has computing power, such as a central processing unit (CPU) or a digital signal processor (DSP), may be applied.

The processor 111 exemplary embodies functions as the OF switch 11 by as appropriate reading programs and data stored in the memory 112 and operating them. Programs may be referred to as software or applications. Data may include a flow table 1121, as illustrated in FIG. 6.

Functions embodied by the OF switch 11 according to the operation of the processor 111 may include functions as a packet-in transmitting unit 1111, a packet-out receiving unit 1112, and a flow transferring unit 1113, as illustrated in FIG. 6.

The processor 111 creates a packet-in destined for the OFC 12 and transmits the packet-in to the NW-IF 113 through the bus 114. The packet-in destined for the OFC 12 may be exemplary created in response to detecting that a method of processing a received LLDP message has not been set in the flow table 1121 stored in the memory 112.

The packet-out receiving unit 1112 receives a packet-out transmitted from the OFC 12 through the NW-IF 113 and bus 114.

The flow transferring unit 1113 performs transfer processing on a data flow, according to settings in the flow table 1121. For example, the flow transferring unit 1113 transfers a received packet to an appropriate port, according to the settings in the flow table 1121.

The flow transferring unit 1113 may create an LLDP message when, for example, the packet-out receiving unit 1112 receives a packet-out, and may transmit the LLDP message to a port of the NW-IF 113, which is specified in the packet-out.

In other words, the flow transferring unit 1113 may set a port specified in a packet-out received from the OFC 12 as a port from which an LLDP message is to be transmitted. Therefore, the flow transferring unit 1113 may be regarded as an example of a control unit that controls the setting of a port from which an LLDP message is to be transmitted.

The memory 112 exemplary stores the programs and data (that may include the flow table 1121) described above. The memory 112 is an example of a storage device or a storage medium. As the memory 112, a RAM, a flash memory, an SSD, an HDD, or the like may be applied.

The flow table 1121 is exemplary an example of path information used in a flow transfer performed by the flow transferring unit 1113. Exemplary, the path information may be calculated by the OFC 12 and may be set in the OF switch 11.

The NW-IF 113 is exemplary an interface that enables communication with another OF switch 11 and the OFC 12. LLDP messages including packet-ins and packet-outs described above may be transmitted and received through the NW-IF 113.

For example, when attention is focused on reception processing, the NW-IF 113 is an example of a receiving unit that receives a packet-out transmitted from the OFC 12 and is also an example of a receiving unit that receives an LLDP message transmitted from another OF switch 11 in response to a command from the OFC 12.

When attention is focused on transmission processing, the NW-IF 113 is an example of a transmitting unit that transmits a packet-in transmitted from the packet-in transmitting unit 1111 to the OFC 12. The NW-IF 113 may establish communication with the OFC 12 in TCP or TLS described above.

Examples of Operations

Examples of detecting the topology of the OF network 1 described above will be described below with reference to FIGS. 7 to 20. In the example in FIG. 7, attention is focused on three OF switches 11-1 to 11-3.

The OF switch 11-1 exemplary includes two ports denoted by p1 and p2, and the OF switches 11-2 and 11-3 each exemplary include three parts denoted by p1 to p3.

In the example in (1) in FIG. 7, physical connections have been established for all the three OF switches 11, but no link has been found for them (this state may be referred to as an initial state). However, it is assumed that sessions have been established between the OF switches 11-1 to 11-3 and the OFC 12 in TCP (or TLS) and the OFC 12 has been notified of information on ports (identification information such as port numbers) in the course of establishing these sessions. Therefore, the OFC 12 acknowledges port information on the OF switches 11-1 to 11-3. The port information may be stored in, for example, the topology information storage unit 121 illustrated in FIG. 5.

In the initial state, the OFC 12 assumes that the LLDP transmission pattern control unit 127 has selected, for example, the OF switch 11-1 as a first target for which the OFC 12 tries to find a link. Any OF switch 11 may be selected at random as the first target for which the OFC 12 tries to find a link. Alternatively, an OF switch 11 may be selected according to a policy as described below.

After the selection, the LLDP transmission pattern control unit 127 gives a command to the LLDP frame creating unit 122 so as to create packet-out messages destined for the OF switch 11-1 as illustrated in, for example, FIGS. 8A and 8B.

As illustrated in FIGS. 8A and 8B, packet-out messages may be created separately for different ports of the OF switch 11-1. Each packet-out message may include an LLDP header and a payload. In the payload, transmission destination port information and transmission source port information of the LLDP message may be set.

In the transmission destination port information, information indicating a port of the OF switch 11-1 from which to transmit the LLDP message may be set.

For example, in the example in FIG. 8A, information indicating the port p1 of the OF switch 11-1 (port information represented by, for example, SW1[p1]) may be set as the transmission destination port information in a first packet-out.

Similarly, in the example in FIG. 8B, information indicating the port p2 of the OF switch 11-1 (port information represented by, for example SW1[p2]) may be set as the transmission destination port information in a second packet-out.

In both the first and second packet-outs, identification information on the OFC 12 may be set as the transmission source port information. A packet-out common to the ports p1 and p2 may be created. For example, the OFC 12 may create a packet in which both SW1[p1] and SW1[p2] above are set in one payload as the port information.

Upon reception of the packet-outs from the OFC 12, the OF switch 11-1 transmits LLDP messages from the ports p1 and p2 identified by the transmission destination port information included in the received packet-outs, as illustrated in (2) in FIG. 7. These LLDP messages may be regarded as equivalent to first topology detection signals.

FIG. 9A illustrates an example of an LLDP message that the OF switch 11-1 transmits from the port p1, and FIG. 9B illustrates an example of an LLDP message that the OF switch 11-1 transmits from the port p2.

As illustrated in FIG. 9A, the OF switch 11-1 creates an LLDP message in which the transmission source port information indicating the port p1 (for example, SW1[p1]), the port p1 being the transmission source of the LLDP message, is set in the payload, and transmits the created LLDP message from the port p1.

As illustrated in FIG. 9B, the OF switch 11-1 also creates an LLDP message in which the transmission source port information indicating the port p2 (for example, SW1[p2]), the port p2 being the transmission source of the LLDP message, is set in the payload, and transmits the created LLDP message from the port p2. In FIGS. 9A and 9B, the transmission destination port information may be left vacant.

The LLDP message transmitted from the port p1 of the OF switch 11-1 reaches the port p1 of the OF switch 11-2 linked to the port p1 of the OF switch 11-1. The LLDP message transmitted from the port p2 of the OF switch 11-1 reaches the port p1 of the OF switch 11-3 linked to the port p2 of the OF switch 11-1.

When the OF switches 11-2 and 11-3 receive the LLDP message through the ports p1 thereof, they check a method of processing the received LLDP message with reference to the flow table 1121.

Since, in this example, no LLDP message processing method is set in the flow table 1121 (this state is an initial state), both the OF switches 11-2 and 11-3 create a packet-in message and transmit the created packet-in message to the OFC 12. In the packet-in message, port information on the port via which the LLDP message has been received may be set as the transmission source port information.

FIG. 10A illustrates an example of a packet-in message that the OF switch 11-2 transmits to the OFC 12, and FIG. 10B illustrates an example of a packet-in message that the OF switch 11-3 transmits to the OFC 12.

As illustrated in FIG. 10A, the OF switch 11-2 creates an LLDP message in which information on the port p1 via which the LLDP message has been received (for example, SW2[p1]) is set in the payload as the transmission source port information, and transmits the created LLDP message to the OFC 12.

As illustrated in FIG. 10B, the OF switch 11-3 creates an LLDP message in which information on the port p1 via which the LLDP message has been received (for example, SW3[p1]) is set in the payload as the transmission source port information, and transmits the created LLDP message to the OFC 12.

In FIGS. 10A and 10B, identification information on the OFC 12 may be set as the transmission destination port information.

When the OFC 12 receives the packet-in messages transmitted from the OF switches 11-2 and 11-3, the OFC 12 is able to find a link between the OF switches 11-1 and 11-2 and a link between the OF switches 11-1 and 11-3.

For example, the OFC 12 is able to find a link between SW1[p1] and SW2[p1] from the transmission destination port information (SW1[p1]) in the packet-out in FIG. 8A and the transmission source port information (SW2[p1]) in the packet-in in FIG. 10A.

Similarly, the OFC 12 is able to find a link between SW1[p2] and SW3[p1] from the transmission destination port information (SW1[p2]) in the packet-out in FIG. 8B and the transmission source port information (SW3[p1]) in the packet-in in FIG. 10B.

The OFC 12 causes, for example, the topology updating unit 126 to store information on the found links (the information may be referred to as link information) in the topology information storage unit 121. Link information is accumulated and updated each time a packet-in is received. A set of link information accumulated in the topology information storage unit 121 may be referred to as topology information.

The OFC 12 (specifically, the LLDP transmission pattern control unit 127, for example) excludes port information on the found links from candidates to be set in the transmission destination port information of new packet-outs, according to the topology information. In the example described above, port information on SW2[p1] and SW3[p1] are excluded from the candidates to be set.

Therefore, for example, the OFC 12 transmits, to the OF switch 11-2, a packet-out that commands transmission of LLDP messages from the ports p2 and p3 other than the port p1, out of the ports p1 to p3 of the OF switch 11-2.

Similarly, the OFC 12 transmits, to the OF switch 11-3, a packet-out that command transmission of LLDP messages from the ports p2 and p3 other than the port p1, out of the ports p1 to p3 of the OF switch 11-3.

Figure 11A:
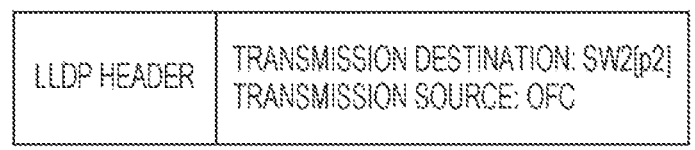
FIGS. 11A and 11B are diagrams each illustrating an example of a packet-out message transmitted from an OFC that has received a packet-in message, to an OF switch from which the packet-in message was transmitted, according to an embodiment.
Figure 11B:
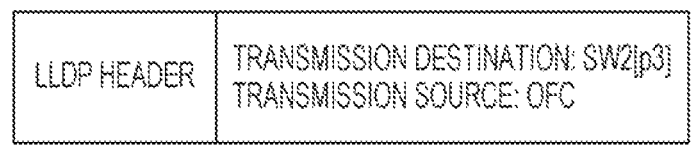

FIGS. 11A and 11B illustrate an example of packet-out messages that the OFC 12 transmits to the OF switch 11-2.

As illustrated in FIG. 11A, the OFC 12 creates a packet-out in which information indicating the port p2 of the OF switch 11-2 (for example, SW2[p2]) is set in the payload as the transmission destination port information, and transmits the created packet-out to the OF switch 11-2.

As illustrated in FIG. 11B, the OFC 12 creates a packet-out in which information indicating the port p3 of the OF switch 11-2 (for example, SW2[p3]) is set in the payload as the transmission destination port information, and transmits the created packet-out to the OF switch 11-2.

In the packet-outs illustrated in FIGS. 11A and 11B, identification information on the OFC 12 may be set as the transmission source port information. The OFC 12 may similarly transmit packet-outs to the ports p2 and p3 of the OF switch 11-3.

Upon reception of the packet-out from the OFC 12, each of the OF switches 11-2 and 11-3 transmits an LLDP message from the ports p2 and p3 identified by the transmission destination port information included in the received packet-out, as illustrated in (3) in FIG. 7. These LLDP messages may be regarded as equivalent to second topology detection signals.

FIG. 12A illustrates an example of an LLDP message that the OF switch 11-2 transmits from the port p2, and FIG. 12B illustrates an example of an LLDP message that the OF switch 11-2 transmits from the port p3.

As illustrated in FIG. 12A, the OF switch 11-2 creates an LLDP message in which transmission source port information indicating the port p2 (for example, SW2[p2]), the port p2 being the transmission source of the LLDP message, is set in the payload, and transmits the created LLDP message from the port p2.

As illustrated in FIG. 12B, the OF switch 11-2 also creates an LLDP message in which transmission source port information indicating the port p3 (for example, SW2[p3]), the port p3 being the transmission source of the LLDP message, is set in the payload, and transmits the created LLDP message from the port p3.

In FIGS. 12A and 12B, the transmission destination port information may be left vacant. Since the port p1 of the OF switch 11-2 has not been set in the transmission destination port information in the packet-out, the OF switch 11-2 does not transmit an LLDP message from the port p1.

In the OF switch 11-3 as well, LLDP message transmission is performed in response to reception of a packet-out, as in the OF switch 11-2. For example, the OF switch 11-3 creates an LLDP message in which transmission source port information indicating the port p2 (for example, SW3[p2]), the port p2 being the transmission source of the LLDP message, is set in the payload, and transmits the created LLDP message from the port p2.

The OF switch 11-3 also creates an LLDP message in which transmission source port information indicating the port p3 (for example, SW3[p3]), the port p3 being the transmission source of the LLDP message, is set in the payload, and transmits the created LLDP message from the port p3.

The LLDP message transmitted from the port p2 of the OF switch 11-2 reaches the port p2 of the OF switch 11-3 linked to the port p2 of the OF switch 11-2. The LLDP message transmitted from the port p2 of the OF switch 11-3 reaches the port p2 of the OF switch 11-2 linked to the port p2 of the OF switch 11-3.

When each of the OF switches 11-2 and 11-3 receives the LLDP message through the port p2 thereof, each OF switch checks a method of processing the received LLDP message with reference to the flow table 1121.

Since, in this example, an LLDP message processing method is not set in the flow table 1121 (this state is an initial state), both the OF switches 11-2 and 11-3 create a packet-in message and transmit the created packet-in message to the OFC 12. In these packet-in messages, port information on the port via which the LLDP message has been received may be set as the transmission source port information.

FIG. 13A illustrates an example of a packet-in message that the OF switch 11-2 transmits to the OFC 12, and FIG. 13B illustrates an example of a packet-in message that the OF switch 11-3 transmits to the OFC 12.

As illustrated in FIG. 13A, the OF switch 11-2 creates a packet-in message in which information on the port p2 via which the LLDP message has been received (for example, SW2[p2]) is set in the payload as the transmission source port information, and transmits the created packet-in message to the OFC 12.

As illustrated in FIG. 13B, the OF switch 11-3 also creates a packet-in message in which information on the port p2 via which the LLDP message has been received (for example, SW3[p2]) is set in the payload as the transmission source port information, and transmits the created packet-in message to the OFC 12.

In FIGS. 13A and 13B, identification information on the OFC 12 may be set as the transmission destination port information.

When the OFC 12 receives the packet-in messages transmitted from the OF switches 11-2 and 11-3, the OFC 12 is able to find a link between the OF switches 11-2 and 11-3, as illustrated in (4) in FIG. 7.

For example, the OFC 12 is able to find a link between SW2[p2] and SW3[p2] from the transmission destination port information (SW2[p2]) in the packet-out in FIG. 11A and the transmission source port information (SW3[p2]) in the packet-in in FIG. 13B.

The OFC 12 is also able to find the link between SW2[p2] and SW3[p2] from the transmission destination port information in the packet-out transmitted to the OF switch 11-3 and the transmission source port information in the packet-in received from the OF switch 11-2.

The OFC 12 causes, for example, the topology updating unit 126 to store information on the found links in the topology information storage unit 121 to update the topology information.

One of LLDP messages transmitted from the ports p3 of the OF switches 11-2 and 11-3 may reach a host 13 that is not an OF switch 11.

Figure 16:
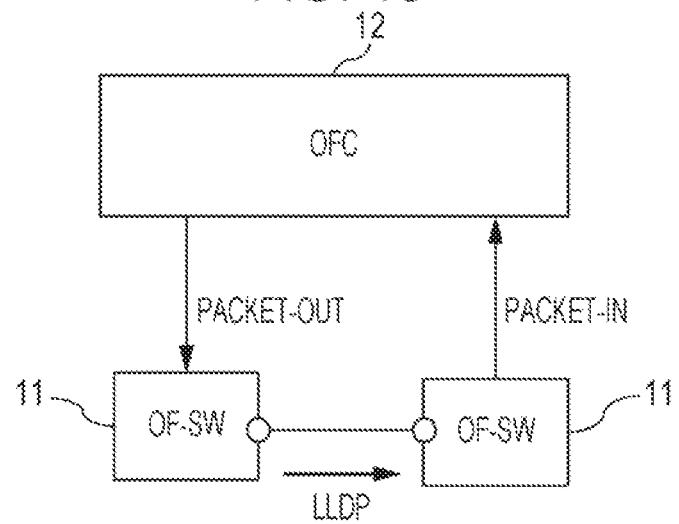
FIG. 16 is a diagram illustrating an example, in which a first OF switch transmits an LLDP message to a second OF switch, and the second OF switch transmits a packet-in message to an OFC in response to the LLDP message, according to an embodiment.
Figure 17:
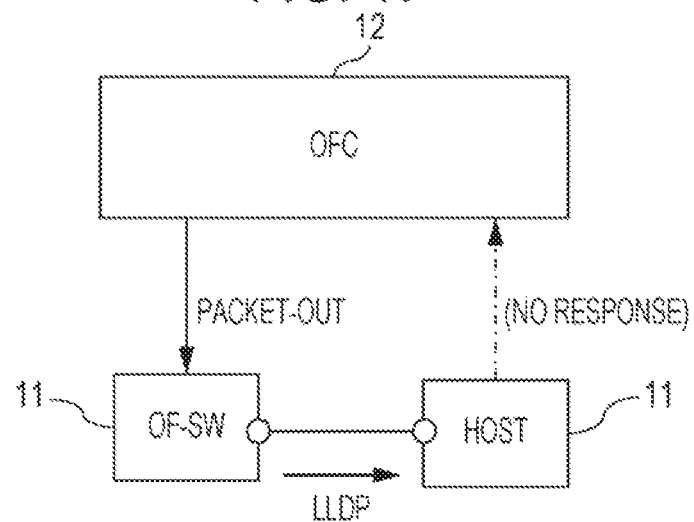
FIG. 17 is a diagram illustrating a case in which, when a host other than an OF switch is connected to a first OF switch, a packet-in message is not transmitted from the host to an OFC, according to an embodiment.

As illustrated in FIG. 16, when the destination at which an LLDP message is received is an OF switch 11, a packet-in message can be transmitted from the OF switch 11 to the OFC 12. When, however, the destination at which an LLDP message is received is a host 13 as illustrated in FIG. 17, since the host 13 is not an OF switch 11, the host 13 does not transmit a packet-in message to the OFC 12.

When one or both of the ports p3 of the OF switches 11-2 and 11-3 are connected to a host 13, the OFC 12 fails to find one or both of a link of the port p3 of the OF switch 11-2 and a link of the port p3 of the OF switch 11-3.

Figure 14A:
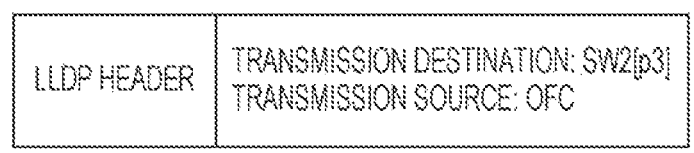
FIGS. 14A and 14B are diagrams each illustrating an example of a packet-out message transmitted from an OFC that has received a packet-in message to an OF switch that transmitted the packet-in message, according to an embodiment.

When the OFC 12 fails to find a link of the port p3 of the OF switch 11-2, the OFC 12 may transmit, to the OF switch 11-2, a packet-out in which information indicating the port p3 (SW2[p3]) is set in the transmission destination port information, as illustrated in, for example, FIG. 14A.

Upon reception of the packet-out, the OF switch 11-2 creates an LLDP message in which information indicating the port p3 (SW2[p3]) is set in the transmission source port information as illustrated in, for example, FIG. 15A, and transmits the created LLDP message from the port p3.

Figure 14B:
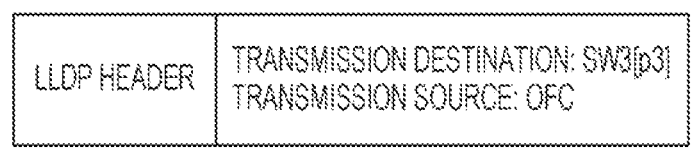

Similarly, when the OFC 12 fails to find a link of the port p3 of the OF switch 11-3, the OFC 12 may transmit, to the OF switch 11-3, a packet-out in which information indicating the port p3 (SW3[p3]) is set in the transmission destination port information, as illustrated in, for example, FIG. 14B.

Upon reception of the packet-out, the OF switch 11-3 creates an LLDP message in which information indicating the port p3 (for example, SW3[p3]) is set in the transmission source port information as illustrated in, for example, FIG. 15B, and transmits the created LLDP message from the port p3.

When the OFC 12 does not receives a packet-in in response to the packet-out transmitted to the OF switch 11-2 within a set time, the OFC 12 may decide that the port p3 of the OF switch 11-2 is linked to, for example, a host 13.

Similarly, when the OFC 12 does not receives a packet-in in response to the packet-out transmitted to the OF switch 11-3 within a set time, the OFC 12 may decide that the port p3 of the OF switch 11-3 is linked to, for example, a host 13.

In (5) in FIG. 7, a case is illustrated in which the ports p3 of the OF switches 11-2 and 11-3 are each linked to a host 13. In this case, the OFC 12 may decide that topology detection has been completed for the three OF switches, 11-1 to 11-3, and may terminate the topology detection. A decision of this type as to whether the topology detection has been terminated may be exemplary made by the topology detection termination deciding unit 128 in FIG. 5.

Figure 18:
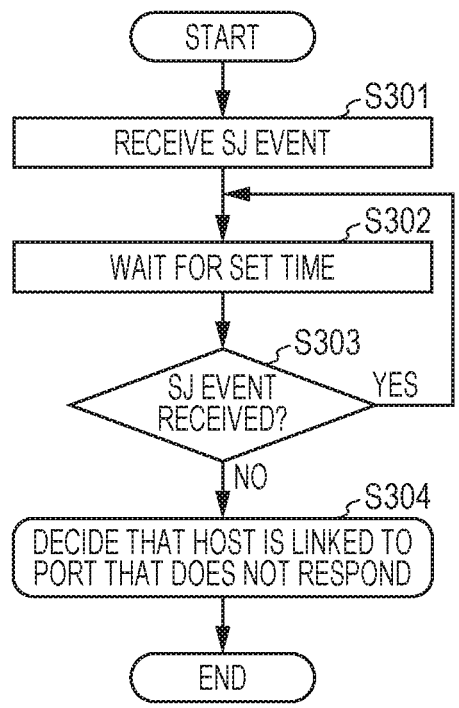
FIG. 18 is a diagram illustrating an example of an operational flowchart for operation of a topology detection termination deciding unit in an OFC, according to an embodiment.

The topology detection termination deciding unit 128 may exemplary make a decision as to whether the topology detection has been terminated according to the flowchart illustrated in FIG. 18.

For example, when the topology detection termination deciding unit 128 detects reception of an SJ event transmitted from an OF switch 11 (processing S301), the topology detection termination deciding unit 128 waits for a set time (processing S302) and then monitors whether an SJ event is received again (processing S303).

The SJ event is received at, for example, the OF switch connecting unit 124 in FIG. 5. The OF switch connecting unit 124 notifies the topology detection termination deciding unit 128 of the reception of the SJ event. The set time may be measured by a timer. For convenience, the timer may be referred to as the SJ reception waiting timer. As illustrated in FIG. 5, the SJ reception waiting timer 1281 may be disposed in the topology detection termination deciding unit 128. The set time measured by the SJ reception waiting timer 1281 may be changeable by a setting.

When an SJ event is received before the SJ reception waiting timer 1281 expires (the result in processing S303 is Yes), the topology detection termination deciding unit 128 continues to monitor reception of an SJ event. In this case, the SJ reception waiting timer 1281 may be reset.

When an SJ event has not been received before the SJ reception waiting timer 1281 expires (the result in processing S303 is No), the topology detection termination deciding unit 128 may decide that a host 13 is connected to a port for which a link fails to be found because there is no response to the packet-out.

When the result in processing S303 is No, the topology detection termination deciding unit 128 may terminate the topology detection (processing S304). For example, the topology detection termination deciding unit 128 notifies the LLDP transmission pattern control unit 127 (alternatively, the LLDP frame creating unit 122) that transmission of the packet-out may be stopped.

The topology detection termination deciding unit 128 may decide termination of topology detection by a determination method described below. For example, a network operator sets and stores port information on OF switches 11 linked to hosts 13 in the topology information storage unit 121 of the OFC 12 before starting the operation of the OF network 1.

The topology detection termination deciding unit 128 checks whether information on a port for which a link has failed to be found, is stored in the topology information storage unit 121 as a result of topology detection based on LLDP. When, as a result of the check, information on the port having an unfound link is stored in the topology information storage unit 121, the topology detection termination deciding unit 128 may confirm that the port having the unfound link is a port connected to a host 13 and may decide that the topology detection has been completed.

Next, examples of operations focusing on the LLDP transmission pattern control unit 127 in the OFC 12 will be described. The LLDP transmission pattern control unit 127 selects an OF switch 11 to which to transmit a packet-out, and transmits, to the selected OF switch 11, a packet-out in which transmission of an LLDP message from a port linked to an unfound link is commanded, as described above.

The following two cases are assumed as examples of triggers at which the LLDP transmission pattern control unit 127 starts packet-out transmission.

(a) Reception of an SJ event
(b) Reception of a packet-in from an OF switch 11 (a packet-in may be referred to as an LLDP response)

Figure 19:
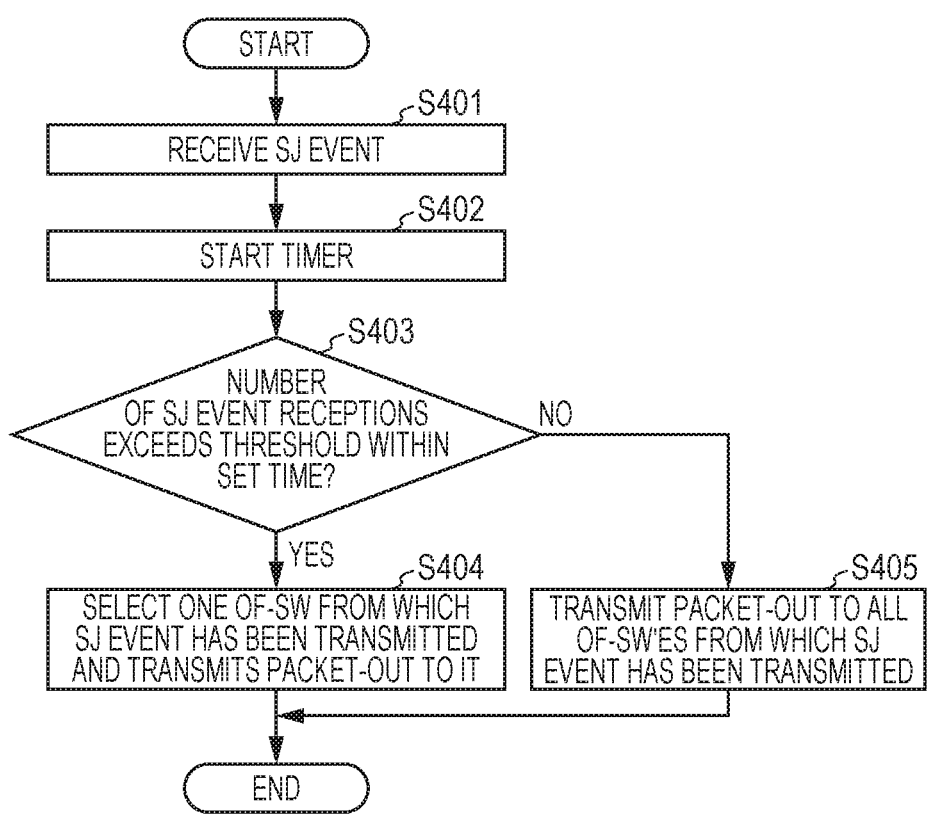
FIG. 19 is a diagram illustrating an example of an operational flowchart for operation of an LLDP transmission pattern control unit in an OFC, according to an embodiment.
Figure 20:
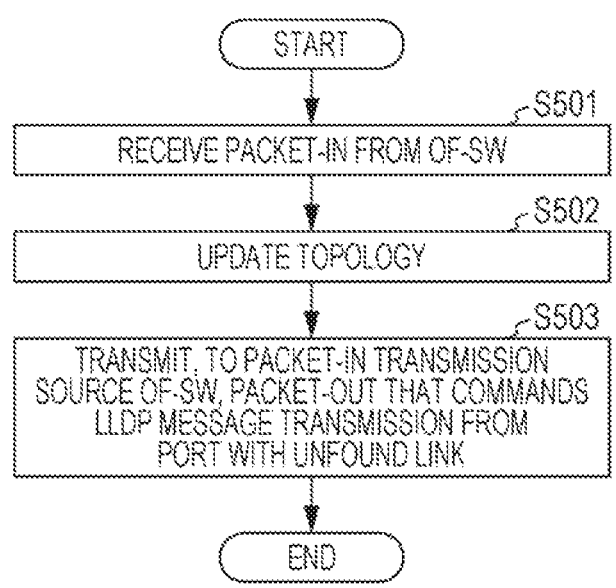
FIG. 20 is a diagram illustrating an example of an operational flowchart for operation of an LLDP transmission pattern control unit in an OFC, according to an embodiment.

Examples of operations of the LLDP transmission pattern control unit 127 in cases (a) and (b) above are respectively illustrated as the operational flowcharts in FIGS. 19 and 20.

First, an operation in case (a) above will be described with reference to FIG. 19.

As illustrated in FIG. 19, when the LLDP transmission pattern control unit 127 receives an SJ event, which has been transmitted from any one of OF switches 11, through, for example, the OF switch connecting unit 124 (processing S401), the LLDP transmission pattern control unit 127 may start a timer (processing S402).

For convenience, the timer may be referred to as the SJ compiling timer. As illustrated in FIG. 5, the SJ compiling timer 1271 may be disposed in the LLDP transmission pattern control unit 127. The SJ compiling timer 1271 measures a set time. The time measured by the SJ compiling timer 1271 may be changeable by a setting.

The LLDP transmission pattern control unit 127 may exemplary count the number of SJ event receptions performed within a set time from when the SJ compiling timer 1271 starts until it expires. The LLDP transmission pattern control unit 127 may check whether the number of SJ event receptions exceeds a threshold within the set time (processing S403).

The threshold may be set at a value within a range in which, when the threshold is not exceeded, the LLDP transmission pattern control unit 127 is not overloaded even if it performs packet-out transmission processing for all OF switches 11 from which the LLDP transmission pattern control unit 127 has received SJ events.

In other words, the threshold may be set according to the processing power of a processor that embodies the LLDP transmission pattern control unit 127. The threshold may be exemplary stored in a memory (not illustrated) disposed in the LLDP transmission pattern control unit 127 or in the topology information storage unit 121 described above.

When the number of SJ event receptions exceeds the threshold (the result in processing S403 is Yes), the LLDP transmission pattern control unit 127 selects, for example, one from OF switches 11 that are candidates for targets for which the LLDP transmission pattern control unit 127 tries to find links, and transmits a packet-out to the selected one (processing S404).

When the number of SJ event receptions does not exceed the threshold (the result in processing S403 is No), the LLDP transmission pattern control unit 127 may transmit a packet-out to all the OF switches 11 from which the LLDP transmission pattern control unit 127 has received an SJ event (processing S405).

As described above, when the LLDP transmission pattern control unit 127 receives SJ events whose number exceeds a threshold, within a time measured by the SJ compiling timer 1271, the LLDP transmission pattern control unit 127 may restrict the number of OF switches 11 selected as destinations to which to transmit a packet-out.

In the example in FIG. 19, the number of OF switches 11 selected as destinations to which to transmit a packet-out (for convenience, the number may be referred to as the limited selection count) is 1. However, the limited selection count may be 2 or greater and smaller than the number SJ event receptions.

For example, the limited selection count of OF switches 11 may be appropriately set according to the processing power of the LLDP transmission pattern control unit 127. In other words, the limited selection count of OF switches 11 may be set at a value within a range that does not exceed the processing power of the OFC 12.

For an OF switch 11 that has not been selected as a packet-out transmission destination, the LLDP transmission pattern control unit 127 may wait for a certain set time and may then transmit a packet-out to the OF switch 11. When the number of SJ event receptions falls to or below the threshold after a wait for the set time, the LLDP transmission pattern control unit 127 may transmit packet-outs to all the OF switches 11 that have not been selected.

Next, an operation in case (b) above will be described with reference to FIG. 20. As described in FIG. 20, the OFC 12 receives, at the packet-in receiving unit 125, a packet-in that has been transmitted from any one of OF switches 11 (processing S501). Upon reception of the packet-in, the OFC 12 causes, for example, the topology updating unit 126 to updates the topology information stored in the topology information storage unit 121 according to information included in the received packet-in (processing S502).

After the topology information has been updated, the OFC 12 may cause the LLDP transmission pattern control unit 127 to transmit, to the OF switch 11 from which the packet-in has been transmitted, a packet-out that commands LLDP message transmission from a port with an unfound link (processing S503). Processing S503 may be regarded as corresponding to, for example, processing S4 in FIG. 3.

Modifications

The policy that when topology detection starts, the LLDP transmission pattern control unit 127 selects one of OF switches 11 as a first packet-out transmission destination, may be exemplary set and modified appropriately by the network manager.

The policy may be exemplary set and stored in a memory (not illustrated) disposed in the LLDP transmission pattern control unit 127 or may be exemplary set and stored in the topology information storage unit 121 described above.

The following three are non-restrictive examples of policies.

Figure 22:
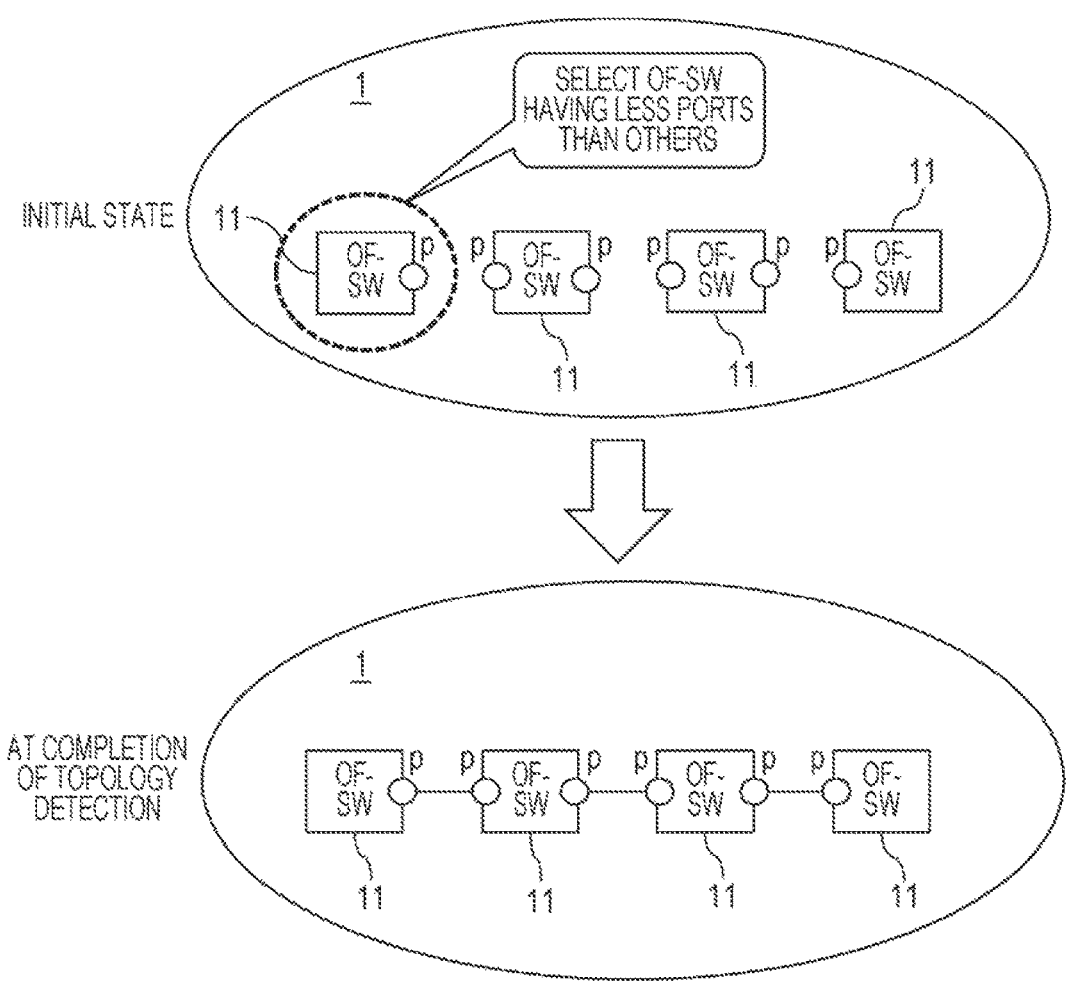
FIG. 22 is a diagram illustrating an example of a configuration of a network, according to an embodiment.
Figure 23:
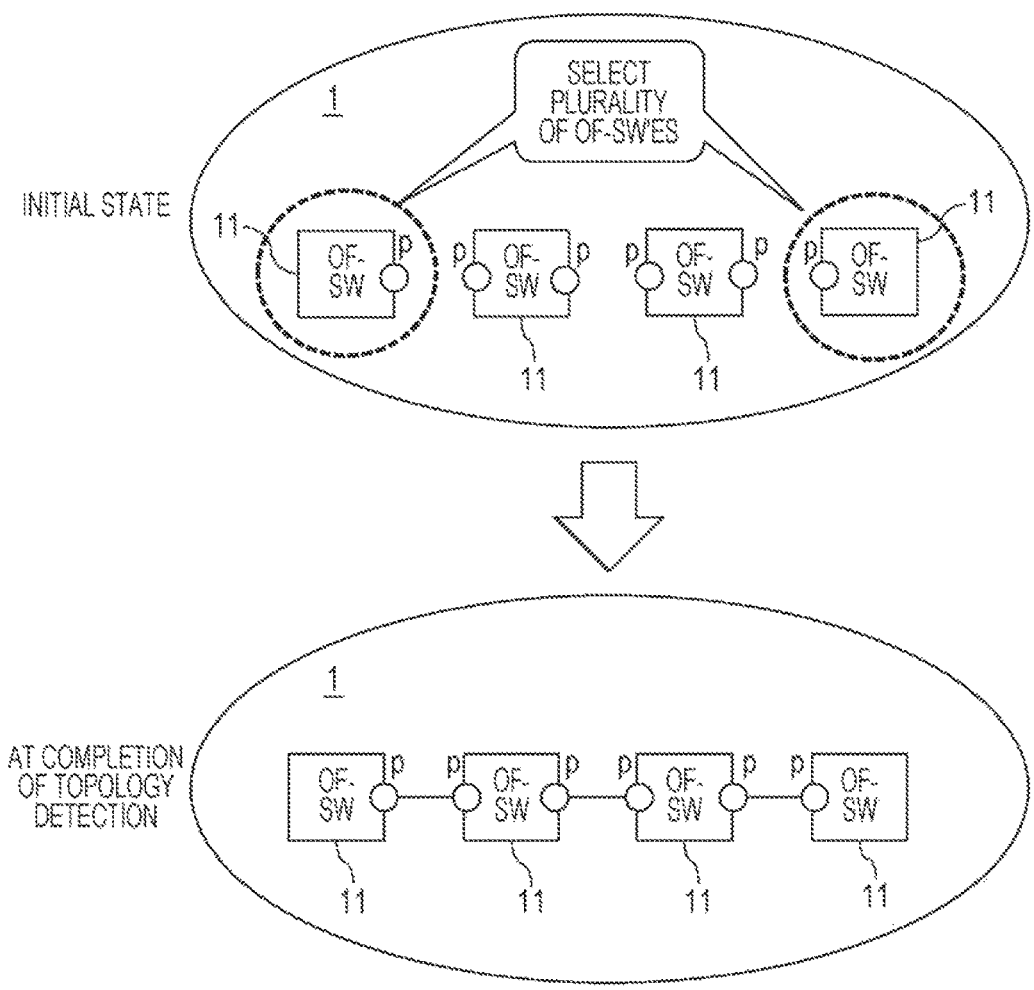
FIG. 23 is a diagram illustrating an example of a configuration of a network, according to an embodiment.

(1) Policy that an OF switch 11 with more ports is preferentially selected (FIG. 21)
(2) Policy that an OF switch 11 with less ports is preferentially selected (FIG. 22)
(3) Policy that a plurality of OF switches 11 are selected (FIG. 23)

Figure 21:
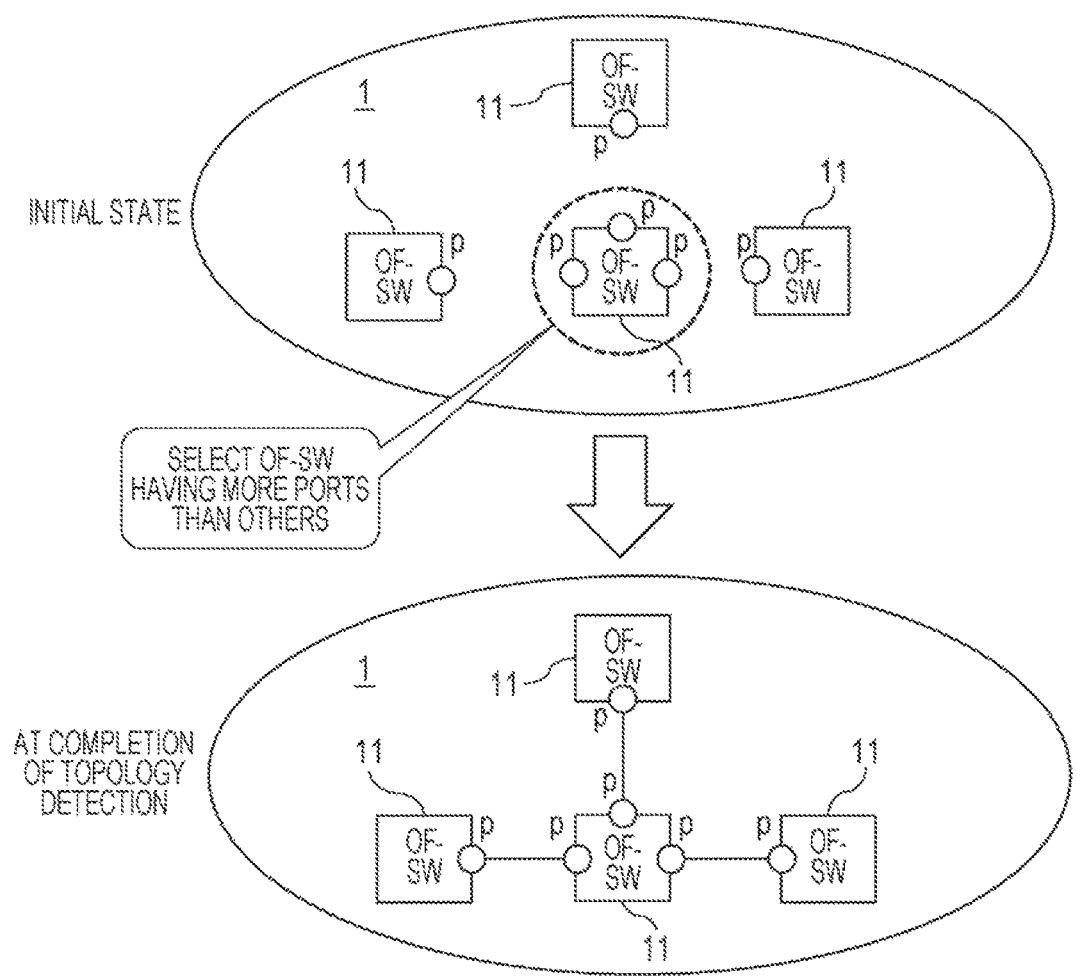
FIG. 21 is a diagram illustrating an example of a configuration of a network, according to an embodiment.

When an OF switch 11 having more ports than other OF switches 11 is preferentially selected as the packet-out transmission destination according to policy (1) as schematically illustrated in, for example, FIG. 21, topology detection may be efficiently performed.

This is because more OF switches 11 are adjacent to the OF switch 11 having more ports than to other OF switches 11, so LLDP messages are transmitted to more adjacent OF switches 11.

When an OF switch 11 having less ports than other OF switches 11 is preferentially selected as the packet-out transmission destination according to policy (2) as schematically illustrated in, for example, FIG. 22, the load on the OFC 12 may be reduced.

This is because less OF switches 11 are adjacent to the OF switch 11 having less ports than to other OF switches 11, so the number of packet-ins transmitted to the OFC 12 may be reduced.

When a plurality of OF switches 11 are selected according to policy (3) as schematically illustrated in, for example, FIG. 23, topology detection may be speeded up due to parallel processing.

Effects obtained by the above policies (1) to (3) depend on the topology of the OF network 1. Therefore, a policy suitable to the topology of the OF network 1 is preferably selected.

When, in response to reception of a plurality of packet-ins, the OFC 12 repeats an operation to transmit a packet-out (for example, processing S501 to S503 in FIG. 20) to all OF switches 11 from which the plurality of packet-ins have been transmitted, the number of packet-out transmission destinations is exponentially increased depending on the topology. Therefore, the number of packet-in receptions at the OFC 12 is also exponentially increased. This leads to the risk of the OFC 12 being overloaded.

Figure 24:
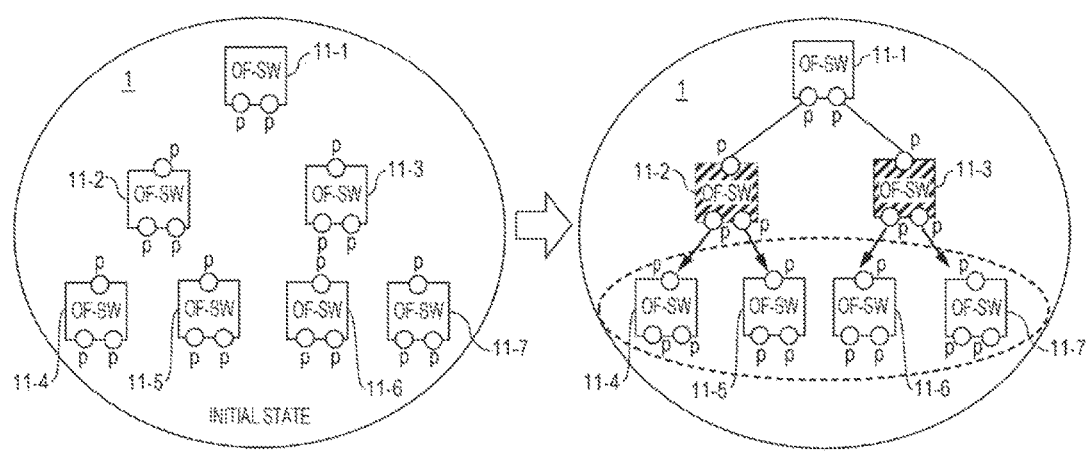
FIG. 24 is a diagram illustrating an example of a configuration of a network, according to an embodiment.

In, for example, the topology schematically illustrated in FIG. 24, it is assumed that the OF switches 11-2 and 11-3 each have transmitted a packet-in to the OFC 12. In this case, the OFC 12 may select the two OF switches 11-2 and 11-3, which are a packet-in transmission source, as packet-out transmission destinations.

When packet-outs are transmitted to the selected OF switches 11-2 and 11-3 at the same time, a packet-out from each of four OF switches 11-4 to 11-7 adjacent to the OF switches 11-2 and 11-3 is received at the OFC 12.

The OFC 12 transmits packet-outs to the four OF switches 11-4 to 11-7 in response to the four packet-in receptions. When the OFC 12 transmits packet-outs to a plurality of OF switches 11 in this way, the number of subsequent packet-in receptions and the number of subsequent packet-out transmissions may be exponentially increased.

In view of this situation, when there are a plurality of packet-out transmission destination targets in processing S503 in FIG. 20, the OFC 12 (specifically, LLDP transmission pattern control unit 127, for example) may exemplary restrict the packet-out transmission destination targets to some of them.

When a plurality of packet-ins are received at the packet-in receiving unit 125 from a plurality of OF switches 11, the LLDP transmission pattern control unit 127 may restrict OF switches 11 that are targets commanded to transmit an LLDP message used for topology detection, to some of the plurality of OF switches 11.

Figure 25:
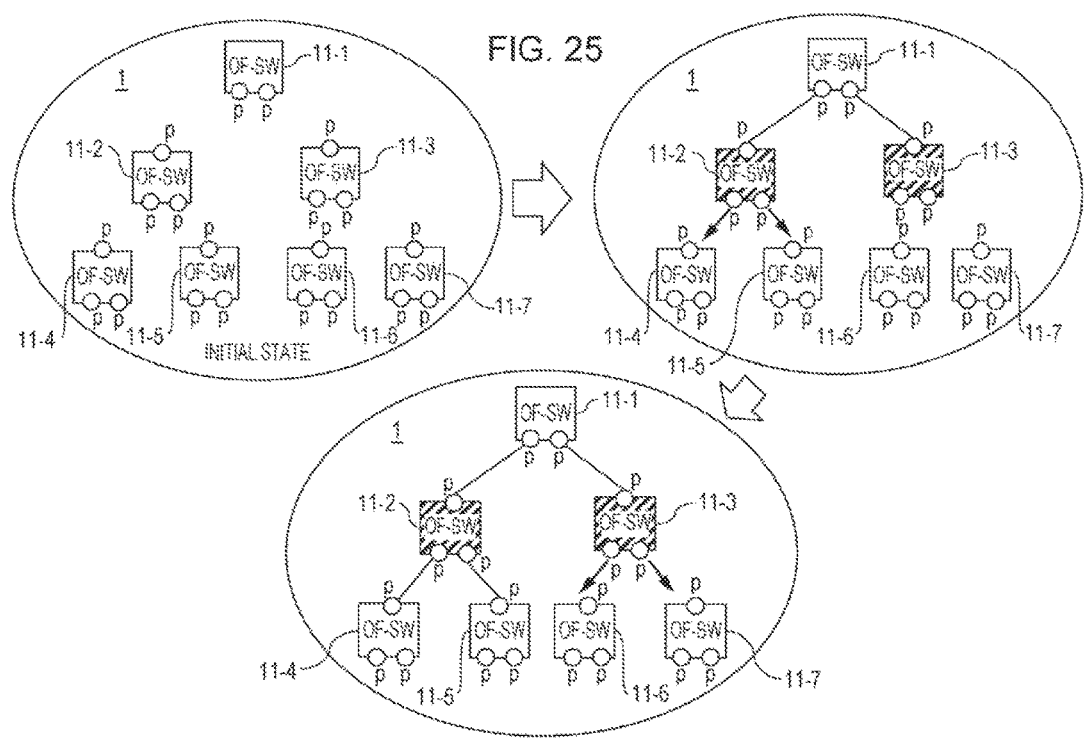
FIG. 25 is a diagram illustrating an example of a configuration of a network, according to an embodiment.

In, for example, the topology schematically illustrated in FIG. 25, it is assumed that the OF switches 11-2 and 11-3 each transmit a packet-in to the OFC 12 and the OF switches 11-2 and 11-3 become candidates to which to transmit a packet-out.

In this case, the LLDP transmission pattern control unit 127 may first transmit a packet-out to one of the OF switches 11-2 and 11-3 and, after topology detection for the one OF switch 11 has been completed, may transmit a packet-out to the other.

As described above, when the number of OF switches 11 to which to actually transmit a packet-out is restricted and topology detection is performed in a step-by-step manner, it is possible to avoid or suppress the number of packet-in receptions and the number of packet-out transmissions from being exponentially increased at the OFC 12. Therefore, the load on the OFC 12 may be reduced.

According to the embodiment, including modifications, described above, the OFC 12 excludes ports for which a link has been found due to packet-in reception, from LLDP message transmission source candidates that would otherwise be specified in packet-outs.

Accordingly, it is possible to suppress an LLDP message used for topology detection (or link finding) from being transmitted from a port, of an OF switch 11, for which a link has been found. Therefore, it is possible to suppress an LLDP message from being redundantly transmitted to a link that the OFC 12 has found.

In other words, an LLDP message is transmitted to a link that the OFC 12 has found, only in one direction. Therefore, the number of LLDP messages flowing through the OF network 1 may be reduced. As a result, the number of packet-in messages transmitted from OF switches 11 to the OFC 12 may be reduced and the processing load of the OFC 12, involved in topology detection, may thereby be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network control apparatus for detecting connection relationships among a plurality of network switches in a communication network, the network control apparatus comprising:

a processor configured to:
    transmit a control signal to a first network switch, the control signal commanding the first network switch to transmit a first topology detection signal from a first plurality of ports provided for the first network switch to a second plurality of ports provided for a second network switch, the second network switch being different than the first network switch;
    receive, from the second network switch that has received the first topology detection signal, a response signal including topology information that has been detected by the second network switch from the first topology detection signal, and
    based on the topology information included in the response signal, control selection of a target port, via which to transmit a second topology detection signal, from among the second plurality of ports provided for the second network switch; and
a memory coupled to the processor, the memory being configured to store the topology information,
wherein the processor selects the first network switch, which is a transmission destination of the control signal, from among the plurality of network switches, based on a predetermined policy, and
wherein the predetermined policy is a policy that a network switch provided with more ports than other network switches is preferentially selected as the first network switch, which is the transmission destination of the control signal, a policy that a network switch provided with less ports than other network switches is preferentially selected as the first network switch, which is the transmission destination of the control signal, or a policy that a plurality of the first network switches are selected as the transmission destination of the control signal.

2. The network control apparatus of claim 1, wherein based on the topology information included in the response signal, the processor excludes, from candidate ports via which the target port is to be selected, a port via which the second network switch has received the first topology detection signal.

3. The network control apparatus of claim 1, wherein the processor is configured to, upon receiving a plurality of the response signals from a plurality of the second network switches, restrict targets network switches from which the second topology detection signal is to be transmitted, to some of the plurality of second network switches.

4. A network switch in a communication network including a plurality of network switches controlled by a network control apparatus, the network switch comprising:
a processor configured to:
receive, from another network switch, a first topology detection signal that has been transmitted by the another network switch based on a control signal received from the network control apparatus, the control signal commanding transmission of the first topology detection signal from a first plurality of ports provided for the another network switch to a second plurality of ports provided for the network switch, the network switch being different than the another network switch,
transmit, to the network control apparatus, a response signal including topology information detected from the first topology detection signal, and
select, from among the second plurality of ports provided for the network switch, a port that has been specified by the network control apparatus, which has received the response signal, according to the topology information, as a port from which to transmit a second topology detection signal; and
a memory coupled to the processor, the memory being configured to store the topology information,
wherein the processor selects the first network switch, which is a transmission destination of the control signal, from among the plurality of network switches, based on a predetermined policy, and
wherein the predetermined policy is a policy that a network switch provided with more ports than other network switches is preferentially selected as the first network switch, which is the transmission destination of the control signal, a policy that a network switch provided with less ports than other network switches is preferentially selected as the first network switch, which is the transmission destination of the control signal, or a policy that a plurality of the first network switches are selected as the transmission destination of the control signal.

5. The network switch of claim 4, wherein
the port specified by the network control apparatus is a port, of the second plurality of ports provided for the network switch, other than ports via which the network switch has received the first topology detection signal.

6. A method for detecting connection relationships among network switches in a communication network controlled by a network control apparatus, the method comprising:
causing a first network switch to, in response to a command from the network control apparatus, transmit a first topology detection signal from a first plurality of ports provided the first network switch to a second plurality of ports provided for a second network switch, the second network switch being different than the first network switch;
causing the second network switch to receive the first topology detection signal and transmit, to the network control apparatus, a response signal including topology information detected from the first topology detection signal; and
causing the network control apparatus to, based on the topology information included in the response signal, control selection of a port from which to transmit a second topology detection signal, from among the second plurality of ports provided for the second network switch,
causing the network control apparatus to select the first network switch, which is a transmission destination of the control signal, from among the plurality of network switches, based on a predetermined policy, and
wherein the predetermined policy is a policy that a network switch provided with more ports than other network switches is preferentially selected as the first network switch, which is the transmission destination of the control signal, a policy that a network switch provided with less ports than other network switches is preferentially selected as the first network switch, which is the transmission destination of the control signal, or a policy that a plurality of the first network switches are selected as the transmission destination of the control signal.

7. The method of claim 6, further comprising:
causing the network control apparatus to, based on the topology information included in the response signal, exclude, from candidate ports from which to transmit the second topology detection signal, a port via which the second network switch has received the first topology detection signal.

* * * * *